US008477440B2

(12) United States Patent
Itagaki et al.

(10) Patent No.: US 8,477,440 B2
(45) Date of Patent: Jul. 2, 2013

(54) TAPE RECORDER AND TAPE RECORDING THAT INCREASES EMPTY TAPE AREA WITHOUT LOSS OF NECESSARY DATA

(75) Inventors: Hiroshi Itagaki, Yokohama (JP);
Setsuko Masuda, Yokohama (JP);
Yutaka Oishi, Kawasaki (JP); Terue Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 12/917,943

(22) Filed: Nov. 2, 2010

(65) Prior Publication Data

US 2011/0122522 A1    May 26, 2011

(30) Foreign Application Priority Data

Nov. 26, 2009   (JP) .................................. 2009-268918

(51) Int. Cl.
*G11B 5/86*     (2006.01)
*G11B 19/02*    (2006.01)
*G11B 15/08*    (2006.01)

(52) U.S. Cl.
USPC .............................. 360/15; 360/69; 360/72.1

(58) Field of Classification Search
None
See application file for complete search history.

(56) References Cited

U.S. PATENT DOCUMENTS

| 6,570,729 B1 * | 5/2003 | Takayama ....................... 360/69 |
| 6,788,487 B2   | 9/2004 | Unno |
| 7,236,322 B2 * | 6/2007 | Greco et al. .................... 360/75 |

FOREIGN PATENT DOCUMENTS

JP          11053869 A      2/1999

* cited by examiner

*Primary Examiner* — Regina N Holder
(74) *Attorney, Agent, or Firm* — Brandon C. Kennedy; Cynthia G. Seal; Biggers & Ohanian, LLP (57) ABSTRACT

Provided is a tape recorder that has a tape including at least one partition and that controls access to the tape. The tape recorder includes: means for identifying a position of data on the tape; means for sequentially reading necessary data areas in the data; means for sequentially copying the necessary data areas to the beginning of an empty area on the tape; means for creating a continuous front empty area formed of unnecessary data areas and copy source areas of the necessary data areas on the tape; and means for moving a beginning of the partition (BOP) to a position immediately after the front empty area and for updating the position information on the beginning of the partition.

7 Claims, 10 Drawing Sheets

TAPE RECORDER AND TAPE RECORDING THAT INCREASES EMPTY TAPE AREA WITHOUT LOSS OF NECESSARY DATA

CLAIM OF PRIORITY

This application claims priority under 35 U.S.C §119 to Japanese Patent Application No. 2009-268918 filed Nov. 26, 2009, the entire text of which is specifically incorporated by reference herein.

BACKGROUND OF THE INVENTION

1. Field of the Invention

The field of the invention is data processing, or, more specifically, methods, apparatus, and products for tape recording that increases the capacity of an empty area of tape without loss of necessary data.

2. Description of Related Art

In a conventional tape recorder (also called a "tape drive" in the following description), the logical beginning of a tape (BOT), which is the position where data recording starts, is used as the physical beginning of the tape, and data information to be recorded is recorded from this beginning. The information is read when the tape is inserted, and rewinding is performed when the tape is to be ejected. Further, the types of tape recorders include a cartridge type, an open reel type and the like. In addition, some cartridge type tapes (magnetic tapes) include a memory to record system information.

When a magnetic tape drive is used to periodically record backup data or the like, the drive is mainly used to keep only the most recent data while allowing deletion of previously recorded data. In this case, although the proportion of an unnecessary data area becomes large in a front half portion of the tape, the capacity of the front half portion of the tape is unnecessarily consumed in reality due to sequential access.

In this respect, there has been employed a method to manage the capacity of a tape by copying (making a duplicate of) only effective data onto another tape medium (a medium using a tape is broadly termed as a "tape medium") when the proportion of an unnecessary data area on the tape exceeds a certain amount (such operation is termed as reclaim).

Figure 10:
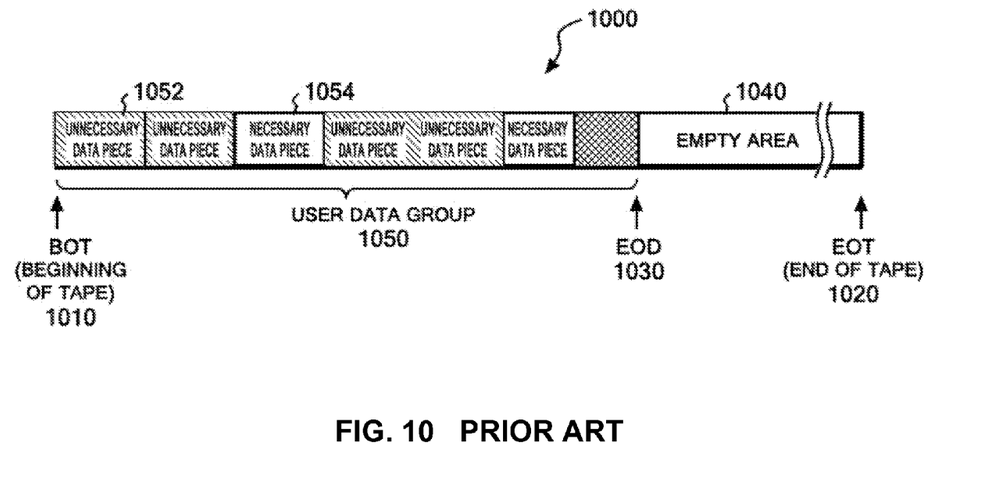
FIG. 10 is a diagram showing an arrangement example of data pieces and an empty area on a tape according to the prior art.

FIG. 10 shows a relationship between an empty area and user data to be written on a tape 1000 by the prior art. Here, the logical beginning of a tape medium, i.e., the write start position, which is the point where data is physically written initially on the tape, is called BOT (Beginning of Tape) 1010. Further, the logical end of the tape, i.e., the write end position, which is the point where data cannot be physically written anymore, is called EOT (End of Tape) 1020. A user data group 1050 on the tape 1000 normally includes a mixture of unnecessary data pieces 1052 and necessary data pieces 1054. The positions of BOT and EOT are always fixed, and the tape drive does not move these positions. This is because the tape drive has no way to determine which data piece is necessary and which data piece is unnecessary among the data pieces written on the tape. Further, the end of actually written data is called EOD (End of Data) 1030. The EOD always exists between the BOT and EOT. The area between the EOD and EOT is a so-called empty area 1040. Normally, the next piece of data is written in this empty area.

Magnetic tape drives often used today, for example, employ a method to write data by moving a write position back and forth many times between the both ends of the single tape while shifting the write position little by little. In this case, the tape has multiple areas each called a partition, and user data can be written in each of the partitions. Note that, such partitions can be created not only in a linear method in which a write position is moved back and forth many times between the both ends of the tape as described above, but also in a helical method in which all data is read or written by single movement of a tape from one end of the tape to the other end thereof as in the case of a video tape.

When each of the positions of the beginning of a partition (BOP) and the end of the partition (EOP) is moved for writing data efficiently on a tape, e.g., when BOP is moved to the back of the tape, there arises a problem that, data existing between the previous position of the BOP and the new position (current position) of the BOP becomes inaccessible.

Japanese Patent Application Publication No. 2002-190163 describes a method for solving a problem of low use efficiency of a tape, which is caused by concentration of access to a certain location in a magnetic tape such as the portion of the beginning thereof. In the method, the position of the logical beginning of a magnetic tape is updated by sequentially moving the position of the logical beginning of the tape. With this method, however, necessary data on the tape may be lost. This is because when the beginning of the tape is updated in this method, there is no operation to move necessary data, and no correspondence is made such as assignment of a record number corresponding to a record being variable-length data.

Japanese Patent Application Publication No. Hei 11-53869 describes a method to avoid reading and writing from and to an unreadable bad data block by providing a tape information management area including management units. The tape information management area is provided in a recordable beginning portion of a magnetic tape (BOT). The management units are configured to register and manage position information on tape marks and position information on unreadable bad data blocks among data blocks. With this method, there remains a problem, however, that the beginning of a tape (BOT) is repeatedly and intensively accessed when the tape is inserted. In addition, this method is considered to be unsuitable for an operation to move the beginning of a tape (BOT).

SUMMARY OF THE INVENTION

Accordingly, it is highly desirable to provide a method for effectively using a tape by increasing an empty area of the tape without loss of necessary data on the tape. The present invention therefore has an object to keep data on a tape even when the beginning of a partition (BOP) is updated in a tape including at least one area called a partition where user data is written. Specifically, the object of the present invention is to provide a tape drive that allows data to be continuously and almost permanently written to a tape while keeping data determined to be necessary by a host system connected to the tape drive, and also to provide a recording method using the tape drive. Further, the present invention has an object to reduce unnecessary data area that often exists on a front half portion of a tape (magnetic tape) and thereby to increase an empty area of the tape.

The tape recorder (referred to as a "tape drive" in the following description) has a tape medium made of a single tape cartridge. This tape medium has at least one partition. This partition has the beginning of the partition (BOP) and the end of the partition (EOP), and user data is written between the BOP and EOP. When the tape medium has multiple partitions, user data included in each of the partitions can be independently updated. When the tape medium has only one partition, the BOP and EOP correspond to the beginning of the tape (BOT) and the end of the tape (EOT) of the prior art, respectively.

When the positions of the beginning of a partition (BOP) and the end of the partition (EOP) are moved for the purpose of efficiently writing data on a tape medium, the following problems exist. Specifically, when the BOP is moved to the back of the tape, data existing between the previous position of the BOP and the new position (current position) of the BOP becomes inaccessible. For this reason, a situation where only unnecessary data exists between the previous position of the BOP and the new position of the BOP needs to be prepared before the BOP is moved. The conventional tape drive, however, has no information about which data is necessary and which data is unnecessary among data written to the tape medium.

On the other hand, a cartridge housing a tape of the tape drive has physical position information on each data saved on the tape, i.e., a so-called tape directory in a nonvolatile memory called a cartridge memory (CM), for example. Accordingly, even when BOP is dynamically moved, corresponding physical positions can be found by effectively using the position information, and thus it is made possible to read necessary data.

According to a first aspect of the present invention, provided is a tape recorder for effectively using a tape by dynamically moving the positions of the beginning of a partition (BOP) and the end of the partition (EOP) and thus increasing an empty area of the tape. The tape recorder has a tape including at least one partition and that controls access to the tape. The tape recorder comprises: means for identifying a position of data on the tape; means for sequentially reading necessary data areas in the data; means for sequentially copying the necessary data areas to a beginning of an empty area on the tape; means for creating a continuous front empty area formed of unnecessary data areas and copy source areas of the necessary data areas on the tape; and means for moving a beginning of the partition (BOP) to a position immediately after the front empty area and for updating position information on the beginning of the partition (BOP). The beginning of the partition (BOP) may be moved to a predetermined position in the front empty area.

Further, the updating means preferably moves an end of the partition (EOP) to a position at an end of the front empty area and adjacent to the beginning of the partition (BOP) on the tape, and updates position information on the EOP. Meanwhile, the updating means may move the beginning of the partition (BOP) to a predetermined position in the front empty area, then move an end of the partition (EOP) to a position immediately before the predetermined position and adjacent to the beginning of the partition (BOP), and update the position information on the BOP and the EOP. Moreover, the necessary data areas created at respective copy destinations by the copying operation form a continuous necessary data group, the necessary data group is located at a position immediately before the empty area at the back of the tape, and the empty area and the front empty area are arranged logically adjacent to each other. In other words, the front empty area is preferably formed of multiple unnecessary data areas and a copy source area of a necessary data area placed between two of the unnecessary data areas, and is preferably continuous to the empty area in the rear direction of the tape.

The tape recorder further comprises storage means for storing the updated position information on the BOP and the EOP, and a record number correspondence table associating copy source positions of the data with copy destination positions thereof. The data is identified by a record number, and a copy destination position of each of the necessary data areas may be registered in the record number correspondence table when the copying operation is performed.

The storage means is preferably selected from the group consisting of: a cartridge memory embedded in a tape cartridge that houses the tape; a house keeping data set (HKDS) area located outside a user data area on the tape; and a memory of a host system externally connected to the tape recorder.

The means for identifying a position of the data on the tape preferably has a memory for acquiring data information on the tape from an externally connected host system and for recording the data information therein, and identifies positions of the unnecessary data areas and the necessary data areas on the tape according to the data information.

The copying operation is preferably performed sequentially for the necessary data areas which exist between the beginning of the partition (BOP) before being updated and an optional one of the unnecessary data areas. Here, the front empty area is formed of multiple unnecessary data areas and a copy source area of a necessary data area placed between two of the unnecessary data areas and is continuous to the empty area in the rear direction of the tape.

A logical end of data (EOD) is preferably located at an end of the necessary data group on the tape, and the end of the data (EOD) is preferably located at a position immediately before the empty area at the back of the tape. The tape includes format identification (FID) corresponding to the partition, and the FID may be located outside a user data area on the tape.

The tape includes two or more partitions, and preferably also includes a buffer area between an end of a predetermined partition (EOP) and a beginning of another partition (BOP) continuous to the predetermined partition.

According to a second aspect of the present invention, provided is a tape recording method for effectively using a magnetic tape by dynamically moving the positions of the beginning of a partition (BOP) and the end of the partition (EOP) and thus increasing an empty area of the tape. The tape recording method is for a tape recorder that has a tape including at least one partition and that controls access to the tape. The method comprises the steps of: identifying a position of data on the tape; sequentially reading necessary data areas in the data; sequentially copying the necessary data areas to a beginning of an empty area on the tape; creating a continuous front empty area formed of unnecessary data areas and copy source areas of the necessary data areas on the tape; and moving a beginning of the partition (BOP) to a position immediately after the front empty area and updating position information on the BOP.

The method preferably further comprises a step of moving an end of the partition (EOP) to a position at an end of the front empty area and adjacent to the beginning of the partition (BOP) on the tape and updating position information on the EOP.

Further, the necessary data areas created at respective copy destinations by the copying operation form a continuous necessary data group, the necessary data group is located at a position immediately before the empty area of the tape, and the empty area and the front empty area are preferably arranged logically adjacent to each other to be continuous.

In the step of identifying a position of the data, positions of the unnecessary data areas and the necessary data areas on the tape are preferably identified according to record numbers corresponding to the data, the record numbers being stored in a controller of the tape recorder.

Moreover, the step of copying the necessary data areas includes a step of updating, after the copying operation, a content of a record number correspondence table including positions of the copy sources and copy destinations of the data, and it is preferable that the copying step is repeatedly performed for the necessary data areas which exist between the beginning of the partition before being updated and an optional one of the necessary data areas.

The position information on the BOP and the record number correspondence table may be stored in a storage selected from the group consisting of: a tape cartridge memory (CM) embedded in a tape cartridge that houses the tape; a house keeping data set (HKDS) area located outside a user data area on the tape; and a memory of a host system externally connected to the tape recorder. Here, the position information on the EOP corresponding to the BOP may be stored.

Further, the method preferably comprises a step of switching the tape recorder to an idle mode before the step of identifying a position of the data on the tape, wherein the step of creating the front empty area includes a step of identifying the copy source areas of the necessary data areas as a new unnecessary data area.

A logical end of data (EOD) is located at an end of the necessary data group, the copying step includes a step of sequentially overwriting the position of the end of the data (EOD) with the necessary data areas, and it is preferable that the end of the data (EOD) is sequentially rearranged at the beginning of the empty area of the tape along with the overwriting step.

Further, the method preferably comprises the steps of: moving the beginning of the partition (BOP) to a predetermined position in the front empty area of the tape, and moving an end of the partition (EOP) to a position immediately before the predetermined position and adjacent to the beginning of the partition (BOP); and updating the position information on the BOP and the EOP.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF THE PREFERRED EMBODIMENTS

Hereinafter, some typical embodiments of a tape recorder and a recording method for the same according to the present invention will be descried. These embodiments are mere examples and do not limit the tape recorder or the tape recording method according to the present invention to these embodiments.

A brief summary of a recording method for a tape drive according to the present invention will be described below. First, data information such as information on an unnecessary data area on a tape is acquired from a host system or from a tape cartridge memory (CM). Next, necessary data pieces existing near the beginning of a partition (BOP) are copied to a position immediately before the end of data (EOD) (operation to make a duplicate of read data and then to write the duplicate is termed as "copy" in the following description) to practically move the necessary data pieces. Accordingly, an area where only unnecessary data exists is prepared in advance in an area of a front half portion of the tape, i.e., in an area within a certain range from the BOP. Specifically, necessary data areas are sequentially copied to the position immediately before the EOD, so that the necessary data pieces near the BOP, which are the copy sources, can be treated as redundant data and thus regarded as an unnecessary area on the tape.

In the manner described above, an empty area is formed in a physical front half portion of the tape, and the necessary data pieces existing between the BOP and the EOD are collected at the position immediately before the EOD to create a group of the necessary data pieces. Thereafter, the BOP is moved to the back to a position in front of the group of the necessary data pieces which are collected at the position immediately before the EOD. Then, a virtually continuous empty area can be formed by moving the BOP in this manner, the virtually continuous empty area extending from an empty area at the back of the tape immediately after the EOD, to the empty area formed at the front of the tape. Here, the end of the partition (EOP) is considered to have virtually moved to the end of the front empty area, i.e., the position immediately before the beginning of the partition (BOP). In this manner, a tape that functions as a virtually endless tape can be realized.

As to the host system connected to the tape drive, when the host system accesses the original address corresponding to one of the necessary data pieces, i.e., the original record number, the tape drive may convert the address into the current address (record number assigned after the moving of the necessary data piece) and then allow access to the new position onto which the data piece is copied and moved, without informing the host system that the necessary data piece has been copied.

Meanwhile, it is also possible to inform the host system of a new copy destination position. In the case of informing the host system of a copy destination position (current position), the necessary data piece at the original position is regarded as no longer necessary after it is confirmed that the host system has received the current position.

Figure 1:
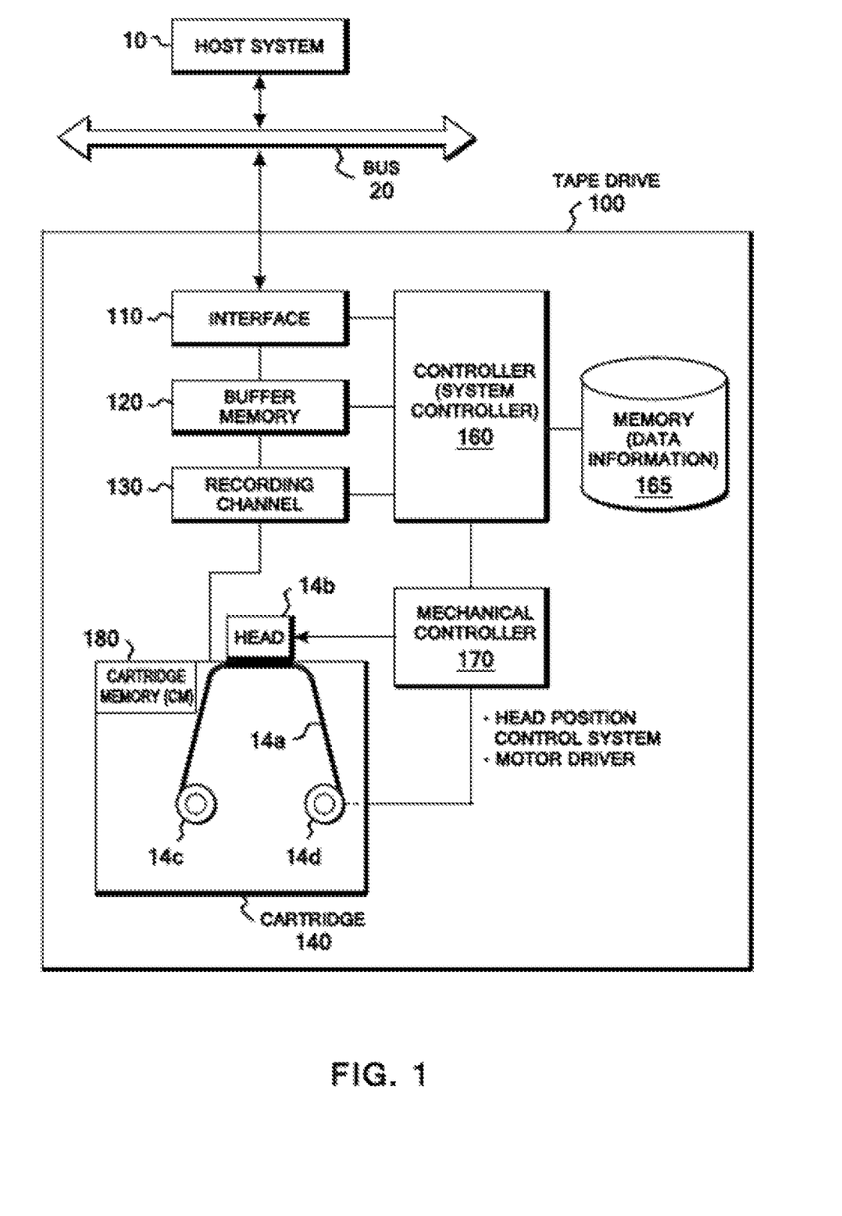
FIG. 1 is a diagram showing a configuration example of a tape drive 100 to which the present invention is applied.

Hereinafter, an embodiment according to the present invention will be described in more detail with reference to the drawings. To begin with, a description will be given of a tape recorder (hereinafter, referred to as a "tape drive") which is a constituent element of the present invention. FIG. 1 shows a configuration diagram of a tape drive 100. The tape drive 100 includes an interface 110, a buffer memory 120, a recording channel 130, a cartridge 140, a controller 160 and a mechanical controller 170. The cartridge 140 has a tape 14*a*, a head 14*b*, a pair of reels 14*c* and 14*d*, and a cartridge memory (CM) 180.

The interface 110 communicates with a host 10 via a bus 20. The interface 110 receives from the host 10 a command to write transferred data to the buffer memory 120, and a command to write data in the buffer memory 120 to the tape 14a. The communication standard of the interface 110 is SCSI or Fibre Channel, for example.

The buffer memory 120 is a memory to accumulate therein variable-length data to be written to the tape 14a and is formed of a dynamic random access memory (DRAM). The buffer memory 120 is partitioned into fixed-length segments, and each of the segments corresponds to a data set (DS) on the tape 14a.

The tape 14a is data recording means and is also called a tape medium. Data is written to or read from the tape 14a by the head 14b via the recording channel 130. The tape 14a is wound around the pair of reels 14c and 14d, and moves along with rotation thereof in a direction directed from the reel 14c to the reel 14d, or in the opposite direction. The cartridge 140 is a container to house therein the reels 14c and 14d around which the tape 14a is wound. Note that, although FIG. 1 shows a system in which two reels are housed in the cartridge 140, it is possible to employ a system in which a single reel is arranged on each of the tape drive side and the tape side.

The tape cartridge 140 includes therein a non-contact non-volatile memory called the cartridge memory (CM) 180. The tape drive updates tape directory information (attribute information on write data) in the CM. When reading data, the tape drive moves the tape to a target position at high speed by referring to the information stored in the CM and performs positioning. In the present invention, information on the beginning of a partition (BOP) and a record number correspondence table relating to moving of data may be recorded in the cartridge memory (CM).

The controller 160 is also called a system controller and is means for controlling the entire tape drive 100. The controller 160 controls writing of data to the tape 14a and reading of data from the tape in accordance with a command received from the host 10 via the interface 110. In addition, the mechanical controller 170 connected to the controller 160 controls a head position control system and a motor driver. The head position control system tracks one or multiple desired wraps (set of multiple tracks) on the tape and performs positioning of the head 14b to the applicable position. The motor driver may be directly connected to the controller 160. The controller 160 according to the present invention has a memory 165, and this memory 165 preferably includes data information (a record number, a file mark and the like for necessary data or unnecessary data) on the tape.

In the operation of the tape drive, an interval at which a data set (DS) is written in the longitudinal direction of the tape medium needs to be minimized for the purpose of reducing a waste of storage capacity. For this reason, the mechanical controller 170 connected to the controller 160 performs positioning of the tape medium 14a to the head 14b in such a way that the next data is written from a position immediately after a data set written to the tape medium (in other words, from the end of data (EOD)).

Figure 2:
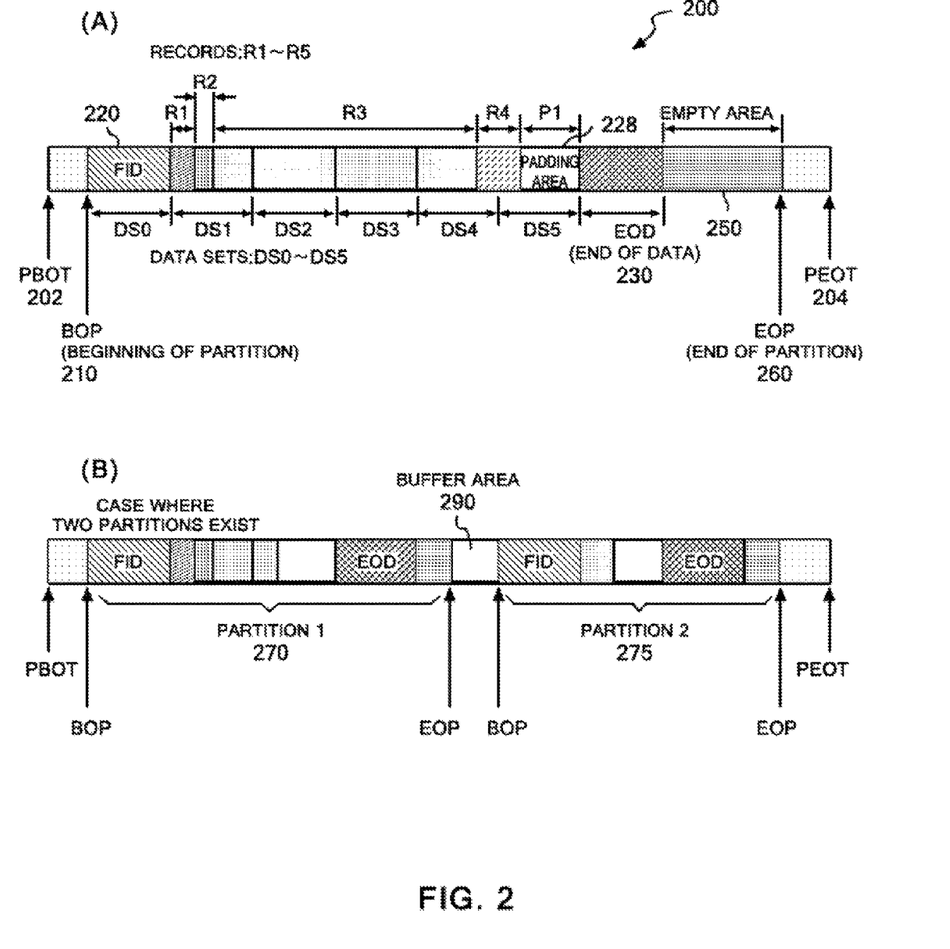
FIGS. 2A and 2B are diagrams each showing a data format example of a tape according to the present invention.

FIGS. 2A and 2B each shows a format example to which the present invention is applied. FIG. 2A shows a format of a tape 200 including data arrangement and an empty area. As will be described later (with reference to FIG. 5), FIG. 2A is considered to be a diagram presenting a tape, which normally has multiple data bands (areas each including user data and abbreviated as DB) thereon and on which data is written in spiral form, is stretched out into a single tape. The tape 200 has physical beginning of tape (PBOT) 202 and physical end of tape (PEOT) 204. The tape 200 has an area called a partition between the PBOT and PEOT, where user data or the like is written. Then, data is written between the beginning of this partition (BOP) 210 and the end of the partition (EOP) 260.

Data is normally represented by a bit set. The tape drive 100 writes data sets (DSs), DS0, DS1, DS2, DS3, DS4 and DS5 to the tape shown in FIG. 2A, each of the data sets being fixed-length data. Each of the data sets is capable of storing therein one or multiple records (denoted as R1, R2, R3 and R4 in FIG. 2A) each being variable-length data that the host system requests the tape drive to write. The initial data set DS0 indicates format identification and is called an FID (Format Identification DS) 220, which has no record and is an area to show what information is written on the tape. In addition, the host system writes a special bit string called a file mark (FM) in a data set instead of a record in some cases. Moreover, when the capacity of a data set (DS) does not fit with the total capacity of a record, the tape drive may add a padding area P1 228, which is a blank space, to create a data set DS5 as in FIG. 2A and write the data set on the tape. At the end of the data sets, an area including no record or file mark (FM) called an end of data (EOD) 230 is written to the tape. Then, an empty area 250 follows the end of data (EOD). The next data is written to this empty area. Normally, the end of the empty area 250 is equivalent to the end of the partition (EOP) 260.

FIG. 2A shows a case where the tape has only one partition, i.e., a case where the entire tape is used as a single partition, and the description of the case has been given above. Alternatively, the tape may include multiple partitions. In this case, each of the partitions may have an area placed between BOP and EOP as shown in FIG. 2B. In a case where multiple partitions exist, data is written to or read from each of the partitions as if no other partitions exist, i.e., data is written or read completely independently. In addition, as shown in FIG. 2B, a buffer area 290 is preferably placed between a partition 1 270 and a partition 2 275. This buffer area 290 can be provided by adjusting a relationship between the tape head and a write width (wrap width) of data. In the relationship between the linear tape shown in FIGS. 2A and 2B and a later-described spiral tape configuration according to the present invention (FIG. 5), BOP and EOP correspond to LP3 and the boundary LP4 in later-described FIG. 5, respectively. In addition, an FID is located between LP2 and LP3. It is considered that a single FID exists in each of the partitions, but multiple partitions may be used as a set by use of a single FID.

Figure 3:
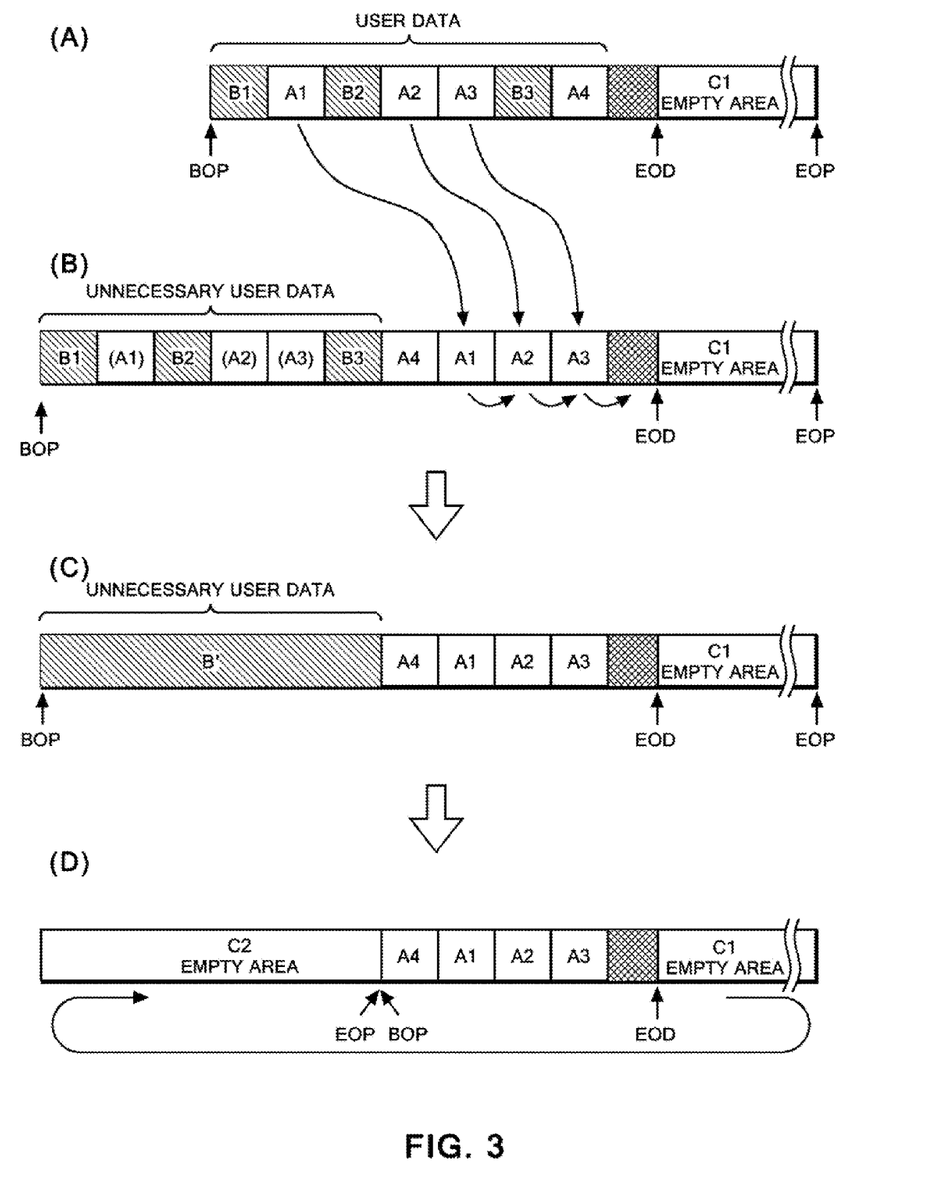
FIGS. 3A to 3D are schematic diagrams for describing a data recording method according to the present invention.

FIGS. 3A to 3D show a relationship between an outline of the tape recording method according to the present invention and data arrangement on the tape. FIG. 3A shows an initial state of the tape. Data is written from the beginning of a partition (BOP) and includes necessary data pieces denoted by A1, A2, A3 and A4 (hereinafter, referred to as An), respectively, and unnecessary data pieces denoted by B1, B2 and B3 (hereinafter, referred to as Bn), respectively, in the drawings. The end of data (EOD) is placed at the last position of the data, i.e., the end thereof. The end of data (EOD) is the last data set and includes no data (no record or file mark). An empty area C1 is located at the back of the EOD. The end of the partition (EOP) is located at the end of C1 at the back of the empty area C1.

FIG. 3B shows a process in which the tape drive sequentially reads the necessary data pieces An after acquisition of data information and then makes copies (duplicates) of the necessary data pieces onto a position from the beginning of the empty area C1 while actually overwriting the area of the EOD with the duplicates. Here, FIG. 3B shows a state after necessary data pieces existing between the beginning of the partition (BOP) and an optional unnecessary data piece (Bn) among the necessary data pieces are sequentially copied and thus moved. Specifically, A1 between the BOP and the unnecessary data piece B2, and A2 and A3 between the BOP and B3 shown in FIG. 3A are sequentially copied and thus moved in FIG. 3B. Note that, along with the copying operation, the copy destination positions are updated in the record number correspondence table which is provided to associate the copy source positions with the copy destination positions.

Next, after the necessary data pieces An are copied, the tape drive identifies the necessary data pieces (A1) (A2) and (A3) of the copy sources in FIG. 3B as unnecessary data pieces. This stage is shown in FIG. 3C. Accordingly, a continuous unnecessary user data area B' is created at the front of the tape.

Lastly, the tape drive identifies the continuous unnecessary user data area B' at the front of the tape as a new front empty area C2. This stage is shown in FIG. 3D. Here, the empty area C1 previously arranged at the back of the tape and the new empty area C2 form a logically continuous empty area (C1-C2). Here, the beginning of the partition (BOP) is moved to the beginning of the group of continuous necessary data pieces (A4, A1, A2 and A3). Next, the end of the partition (EOP) is moved from the end of the empty area C1 to the end of the empty area C2. Note that, it is also possible to move the BOP to a predetermined position Px (not shown) in the front empty area C2 instead of the beginning of the necessary data group. In this case, the EOP may be moved to a position immediately before the predetermined position.

When the procedure described above is performed, the tape drive according to the present invention can consider that the physical end and beginning of the partition are logically continuous and thus can cause the tape to function as a virtually endless tape. Specifically, according to the present invention, the empty area (C1-C2 in FIG. 3D) between the end of the data (EOD) and the logical end of the partition (EOP) can be continuously updated.

Figure 4:
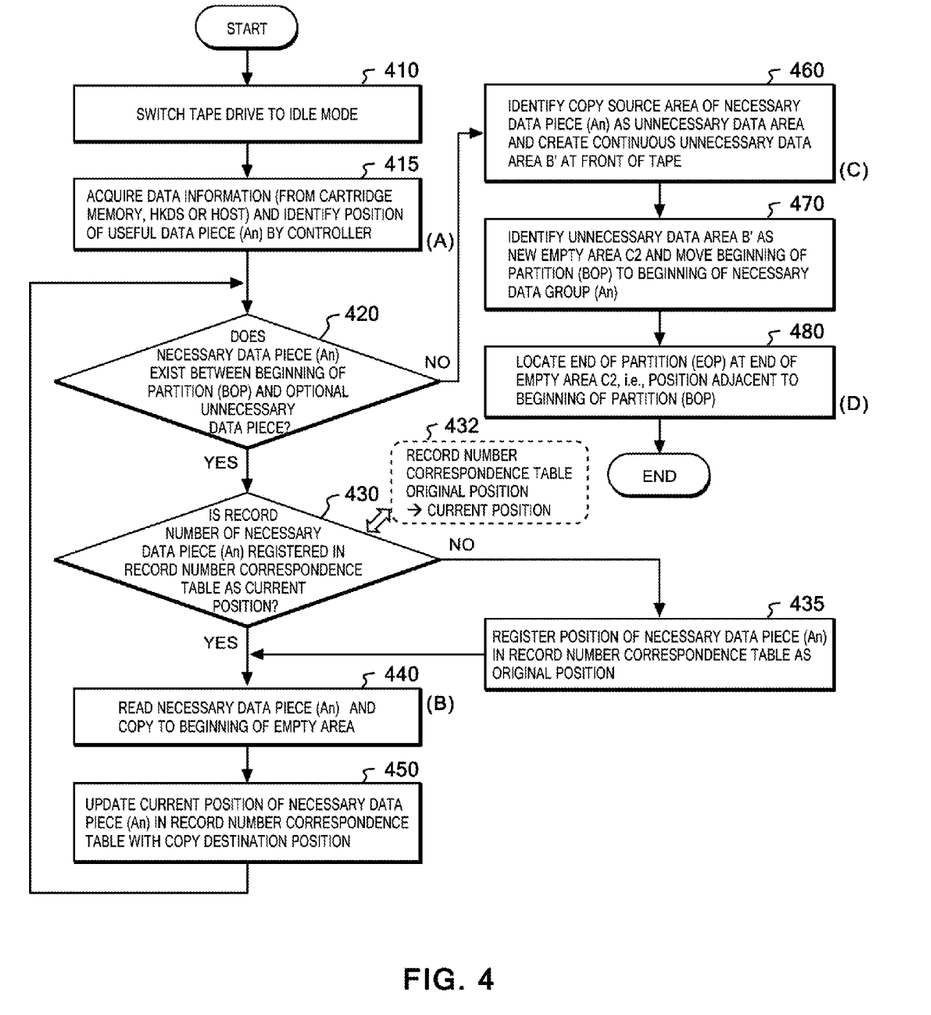
FIG. 4 is a diagram showing a flowchart of the data recording method according to an embodiment.

FIG. 4 is a flowchart showing an example of the embodiment of the data recording method for a tape and showing a flow of realizing the data arrangement (virtually endless tape) on the tape shown in FIG. 3D. Note that in FIG. 4, for the sake of convenience, steps corresponding to the states respectively shown in FIGS. 3A to 3D are denoted by the same reference numerals A to D. Hereinafter, the flowchart shown in FIG. 4 will be described with reference to FIGS. 1 and 3A to 3D.

The controller 160 of the tape drive 100 first switches the tape drive from an operation mode (write mode or read mode) to an idle mode (step 410). Subsequently, the controller 160 acquires data information (a record number, a file mark or the like relating to information on an unnecessary data piece Bn or a necessary data piece An) from the cartridge memory (CM) 180, a house keeping data set (HKDS) area on the tape 14a, or from the host system 10 via the system bus 20. Thus, the position information on a necessary data piece An on the tape is identified by referring to the information (step 415). Here, the HKDS area is an area for managing address information on records and may include information on moving of records.

Next, the controller 160 determines, by referring to the acquired data information, whether or not a necessary data piece An exists between the beginning of a partition (BOP) and an optional unnecessary data piece Bn (step 420). Note that, the information on the beginning of the partition (BOP), and a record number correspondence table 432 are stored in storage means, preferably, in the cartridge memory (CM) 180, the record number correspondence table 432 used for associating a copy source (original position) of a necessary data piece An with a copy destination (current position) thereof when copying of the necessary data piece An is performed in later steps. Instead of being recorded in the CM, the aforementioned information may be recorded in the HKDS area located outside the user data area on the tape, or may be received from the host system 10.

Next, the following is a series of steps of copying a necessary data piece An existing between the beginning of the partition (BOP) and an optional unnecessary data piece Bn to the empty area C1. Specifically, in step 420, when a necessary data piece An exists between the beginning of the partition (BOP) and an optional unnecessary data piece Bn, whether or not a record number of the existing necessary data piece An is registered in the record number correspondence table as the "current position" is determined first (step 430). If the record number is already registered (YES in step 430), the necessary data piece An is read from the tape by use of the head 14b, and then is copied to the beginning position of the empty area C1. In other words, as shown in FIG. 3B, the EOD is sequentially overwritten with necessary data pieces An (step 440). If NO in step 430, i.e., if the record number is not registered in the record number correspondence table as the "current position," the position of the necessary data piece An is registered in the record number correspondence table as the "original position" because the necessary data piece is the copy source. Then, the processing proceeds to step 440 (step 435).

Next, along with the copying operation of the necessary data piece An, the "current position" of the necessary data piece An in the record number correspondence table is updated with the copy destination position (step 450). The determination processing in step 420 is repeated until a necessary data piece An no longer exists between the BOP and an optional unnecessary data piece Bn. Accordingly, the necessary data pieces A1, A2 and A3 are sequentially copied to the beginning of the empty area C1 by repeating the processing from step 430 to step 450. FIG. 3B shows the state where the copying of all the necessary data pieces An is completed.

If NO in step 420, i.e., when a necessary data piece An no longer exists between the BOP and an optional unnecessary data piece Bn, the controller 160 identifies the copy source areas of the necessary data pieces An ((A1), (A2) and (A3) shown in FIG. 3B) as unnecessary data areas. Accordingly, the continuous unnecessary data area B' is created at the front of the tape (step 460). FIG. 3C shows this state.

The controller 160 identifies this continuous unnecessary data area B' to be the new empty area C2, and the empty area C1 previously located at the back of the tape and the new empty area C2 form a logically continuous empty area (C1-C2) at this time. Next, the controller 160 moves the beginning of the partition (BOP) to the beginning of the group of continuous necessary data pieces (An), i.e., to the position immediately after the front empty area C2 (step 470). Next, the controller 160 locates the end of the partition (EOP) at the end of the empty area C2, i.e., at a position adjacent to the BOP (step 480). FIG. 3D shows this state of the data arrangement on the tape. Then, in the step of "moving BOP and EOP," the stored information on the positions of BOP and EOP is updated. Note that, the information on the positions of BOP and EOP is preferably stored in the cartridge memory (CM) or the HKDS (hose keeping data set) area, which is one of the data sets on the tape.

In step 470, the beginning of the partition (BOP) may be moved to a predetermined position (Px) (not shown) in the empty area C2 instead of the beginning of the group of the necessary data pieces (An) (the position immediately after the front empty area C2). In this case, in step 480, the end of the partition (EOP) may be located at a position immediately before the predetermined position (Px) and adjacent to the beginning of the partition (BOP) instead of the position immediately after the empty area C2.

Hereinafter, a description will be given of a record management method according to the present invention, which is shown in FIG. 4 and which uses the record number correspondence table 432. This record management method includes a method of managing records by the tape drive and a method of managing records by the host/application.

The method of managing records by the tape drive is described as follows.

The record number correspondence table can be obtained from the cartridge memory (CM), the HKDS area, or the memory on the host system side when a tape medium is loaded (inserted) into the tape drive or thereafter. The CM and the HKDS area are normally accessed when a tape medium is loaded into the tape drive and various data is read therefrom, and thus the record number correspondence table can also be obtained during the access operation. Otherwise, after the tape medium is loaded, a record number correspondence table corresponding to the loaded tape medium can be obtained from the host system by requesting the host to send the record number correspondence table from the host to the tape drive (by a Write Buffer command or the like).

The obtained record number correspondence table is stored in the memory 165 (random access memory (RAM), for example) of the controller 160 of the tape drive 100 shown in FIG. 1. The record number correspondence table in the memory 165 is updated in step 450 of the flowchart shown in FIG. 4. The updating of the record number correspondence table in the cartridge memory (CM) or the HKDS is preferably performed immediately before step 470 shown in FIG. 4, i.e., immediately before the moving of BOP and EOP.

In a case where the host system is to hold the record number correspondence table, the record number correspondence table is sent to the host. For example, the host sends a SCSI command to the tape drive, and in response to the command, the tape drive sends the record number correspondence table to the host. Note that, the tape drive can send a SCSI command to the host and send the record number correspondence table to the host as well.

The record number correspondence table is used as a reference in the manner shown in the flowchart in FIG. 4. When the host side manages the records, the host can convert a record number into a position obtained after the moving of data, and then instruct the tape drive to perform reading and writing, so that the tape drive does not have to refer to the record number.

When the host side updates a record number, instead of the tape drive, the host may read the record number for the tape drive and issue a command to write data to the position of the EOD.

Although, a method to sequentially copy necessary data pieces to the position immediately before the end of data (EOD) to realize a virtually endless tape function is described, it is also possible to copy necessary data pieces to an optional position. Meanwhile, as a virtually endless tape application, it is possible to allow copying of necessary data pieces only to the EOD.

Assume a case where a necessary data piece near the BOP is copied to the EOD and a new copy (write) destination position is not notified to the host system. When the host is allowed to issue a command to write to an optional position after the copying, the following needs to be considered.

First, a function F(n) is defined as follows. If the n (record number) is registered as the "current value" in the record number correspondence table, the function F(n) returns the original value corresponding to the current value. If the n (record number) is not registered as the "current value," the function F(n) returns the value n itself (n).

When the host issues a request to perform writing from the record number n, for example, among all record numbers i existing between BOP and EOP, a record that satisfies F(i)<F(n) is left, and a record that does not satisfy F(i)<F(n) (satisfy (F(i)>F(n) or F(i)=F(n))) is logically deleted. In other words, regardless of whether or not the record physically exists, the read request from the controller of the tape drive is rejected.

All the records that exist between BOP and EOP and that satisfy F(i)<F(n) are read, and writing (copying) from the front of the EOD is sequentially performed. Subsequently, writing of a data piece newly sent from the host is performed. Then, the BOP is moved to a position that has been the front of the EOD immediately before the write (addition) request is received. Then, when the BOP is moved, the record number correspondence table is updated. Here, the "front of EOD" is preferably a position which is closest to the EOD and which is immediately after the record that satisfies F(i)<F(n), and a record that satisfies F(i)<F(n) and that is adjacent to the record does not have to be rewritten. The moving destination of the BOP in this case does not have to be the beginning of the group of the necessary data pieces (A4, A1, A2 and A3) shown in FIG. 3D, and may be the predetermined position Px (near the end in C2, for example (not shown)) of the empty area C2.

Meanwhile, since it takes a while to start writing, the data that the host intends to perform writing can be temporarily stored in a buffer memory, and then the writing can be performed when the host is notified that the writing is ended. Instead of being stored in the buffer memory, the data that the host intends to perform writing may be temporarily stored in an area outside the user data area on the tape (area between LP2 and LP3 shown in FIG. 5) or an empty area near the EOP.

In addition, it is also possible to perform writing from the EOD after a data piece existing between the position where data is to be logically written (added) and the EOD is marked as unnecessary. In other words, writing is performed from the EOD without moving an already recorded record, and an unnecessary record number table (location where the data acquired in step 410 in FIG. 4 is stored may be shared, for example) for all the records that do not satisfy F(n)<F(i) is registered. Then, if a read request for a record that satisfies a condition other than F(n)<F(i) is received in this case, the read request is rejected.

When this method is employed, a step of checking the unnecessary record number table at the time of reading a record is added.

Figure 5:
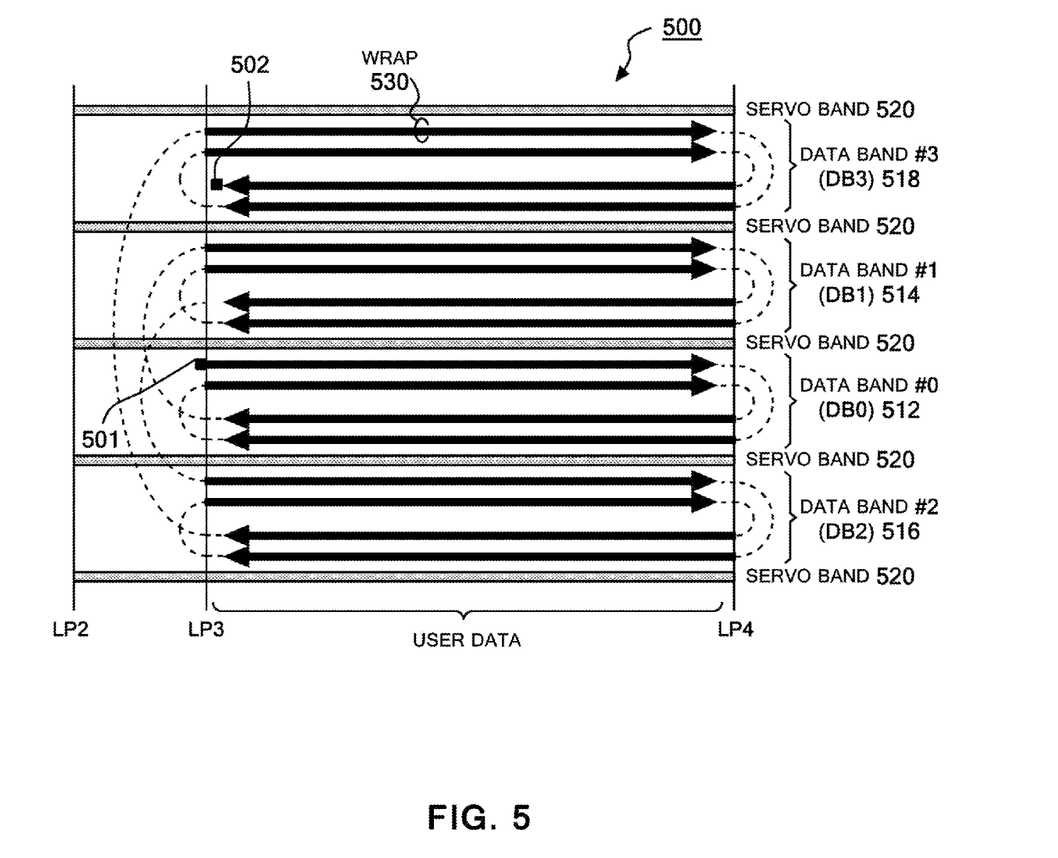
FIG. 5 is a diagram showing an example of the data recording method for a tape of a tape cartridge.

Next, a description will be given of a format example of a tape loaded in a tape cartridge. FIG. 5 is a diagram schematically showing a data recording method and the format example for a tape 500 in the tape cartridge 140. In the drawing, the area between LP2 and LP3 is a calibration area, and the area between LP3 and LP4 is a user data area. As illustrated, five servo bands 520 are provided on the tape 500. Each of the servo bands is an area where a servo pattern showing a physical position on the tape is written at the time of manufacturing of the tape 500.

In addition, in a case where the tape 500 is compliant with the LTO (Linear Tape-Open) standard, the tape 500 is divided into four data bands 512 to 518 (DB0 to DB3) by the five servo bands. Each of the data bands is an area where user data is written, and more than ten elongated data areas (one way direction areas) each called a wrap are provided in each of the data bands. Data is continuously written to wraps 530 of each of the data bands (DBs) in spiral form. In FIG. 5, a single solid-line arrow represents a single wrap 530. Data is read from and written to a wrap in the forward direction as shown by a right directional arrow, and thereafter, data is read from and written to a wrap in the reverse direction as shown by a left directional arrow connected to the right directional arrow by a broken line. In the drawing, two wraps each for data to be read and written in the forward direction and for data to be read and written in the reverse direction in a single data band are shown for the sake of simplification. However, seven to nine wraps are actually provided for each of the forward and reverse directions, for example, and the wraps are spirally arranged in a single data band.

Specifically, reading and writing in the forward direction and reading and writing in the reverse direction are repeatedly performed, and thereby, data is read and written while moving back and forth many times on the tape 500. Note that, FIG. 5 is only a conceptual diagram and does not show the relationship with the head 14*b* shown in FIG. 1. The tape drive 100 normally has multiple heads (write head and read head) 14*b*.

Further, in the format of the tape 500 described above, data is read and written along the wraps 530 spirally arranged in a data band #0, from a start position 501 as the origin, the start position 501 being the aforementioned beginning of a partition (BOP). Thereafter, the operation moves in the order of data bands #1, #2 and #3 while data is read and written along the wraps spirally arranged in each of the data bands. Then, the operation proceeds to an end position 502, which is the aforementioned end of the partition (EOP). As a general rule, in this format, the operation moves to the next data band after the wraps in a certain data band are used up. FIGS. 2A and 2B are considered to be diagrams each showing a configuration obtained by stretching the spiral tape format shown in FIG. 5 into a straight line. In addition, the spiral tape may include not only a single partition as in the case of FIG. 5, but also multiple different partitions each having a different start position 501 and end position 502.

Figure 6:
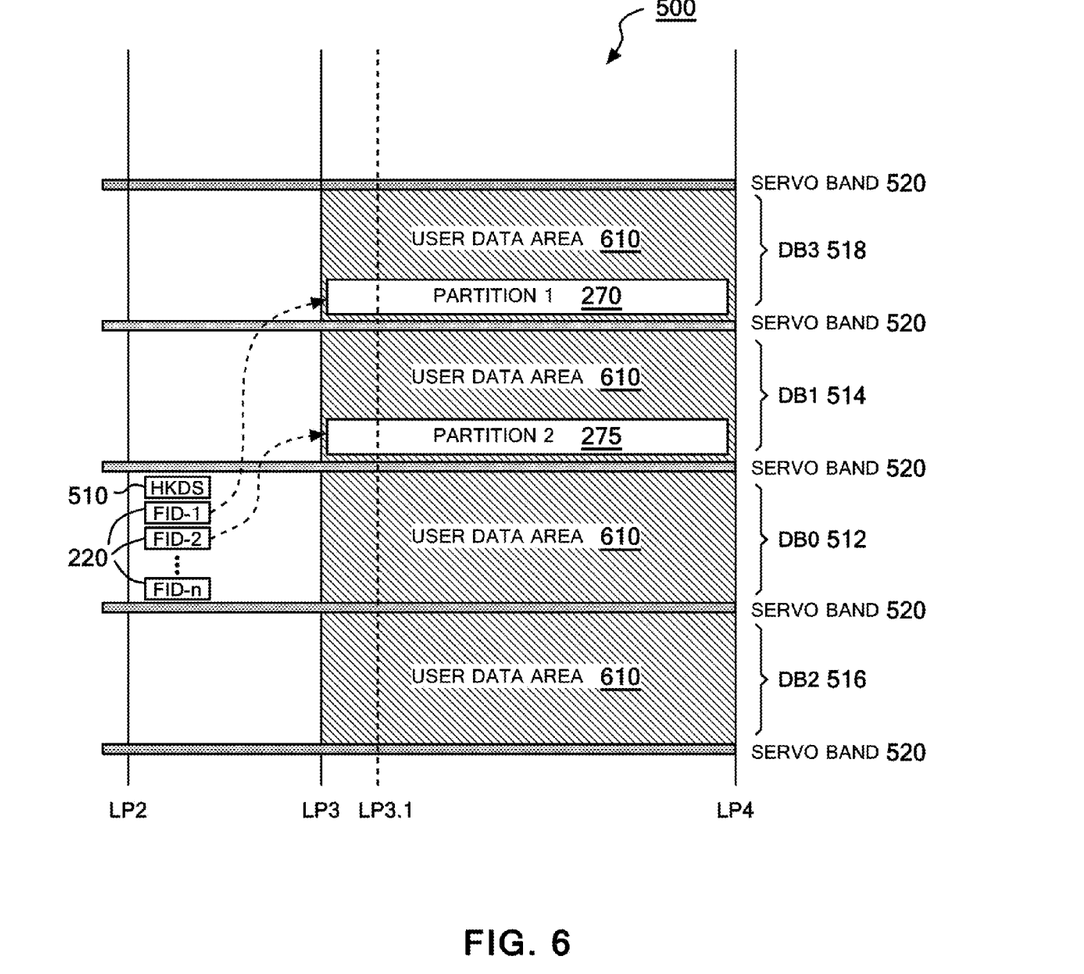
FIG. 6 is a diagram showing a format example according to the present invention for the tape of the tape cartridge.

FIG. 6 shows a format example according to the present invention for the tape in the tape cartridge. As shown in FIG. 6, the tape 500 has an area for managing address information on records, which is called a house keeping data set (also referred to as HKDS) 510, between LP2 and LP3, and which is also allowed to include information on moving of records therein. This HKDS 510 can be used in place of the aforementioned cartridge memory (CM) or together with the CM. In addition, the aforementioned FID (format ID) 220 can be located between LP2 and LP3. In general, FID is located between LP3 and LP3.1 immediately below the center servo band, but in the embodiment according to the present invention, when an HKDS exists, an FID is located between LP2 and LP3 and below the HKDS area. In addition, as shown in FIG. 6, multiple FIDs corresponding to the number of partitions, for example, can be arranged while being aligned in a single column. Although the multiple FIDs are vertically aligned in FIG. 6, the multiple FIDs may otherwise be horizontally aligned in a single row. The interval between LP2 and LP3 normally has a length of about 8 mm. Accordingly, it is possible to write multiple data sets (DSs) such as multiple FIDs, each of which normally has a length of about 0.1 mm.

In this invention, data is written to the tape by writing an FID to a position between the LP2 and LP3 shown in FIG. 6, and subsequently, writing a partition 270 or 275 including a data set corresponding to the FID in a user data area 610 existing in an area between LP3 and LP4. The same goes for a case where multiple partitions exit. Referring to FIG. 6, the diagram shows how partitions 1 and 2 respectively corresponding to FID-1 and FID-2 are arranged in different data bands. Note that, it is also possible to arrange two partitions in a single data band (DB).

Figure 7:
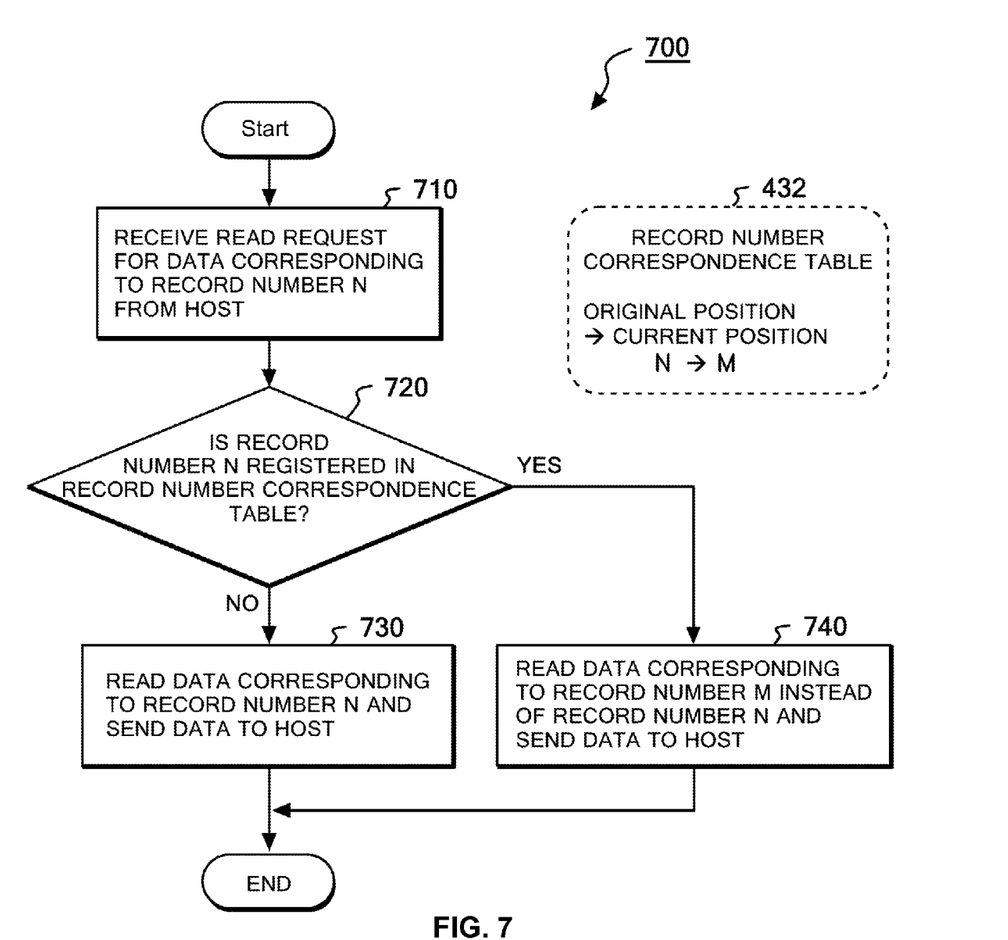
FIG. 7 is a diagram showing an example of a data reading method (flowchart) according to the present invention.

FIG. 7 is a flowchart showing an example of a data reading method according to the present invention, the method using a record number correspondence table. The flowchart shows an operation of the tape drive 100 in response to a read command from the host system 10. In the following description, for the sake of convenience, the "original position" of a copy source is referred to as a record number N and the "current position" of a copy destination is referred to as a record number M in the record number correspondence table.

To begin with, the controller 160 of the tape drive 100 receives a read command for data corresponding to a record number N from the host system 10 (step 710). Then, the controller 160 first determines whether or not the record number N is registered in the record number correspondence table (step 720). Then, if the record number N is registered (YES in step 720), the controller 160 reads data corresponding to a record number M according to the record number correspondence table instead of the record number N, and then sends the read data to the host system 10 (step 740). This reading of the data can be performed after the controller 160 causes the mechanical controller 170 to operate, and matches the position of the head 14*b* with the applicable position on the tape by the head position control system and the motor driver. If No in step 720, the controller 160 reads data corresponding to the record number N and sends the read data to the host system 10 (step 730).

In a case where the host keeps and manages the record number correspondence table, the host updates a record number to a position obtained after moving of data on the kept record number correspondence table, so that the tape drive does not have to refer to the record number correspondence table. Then, the host may issue a read command or a write command to the tape drive on the basis of the record number corresponding to the updated position.

Figure 8:
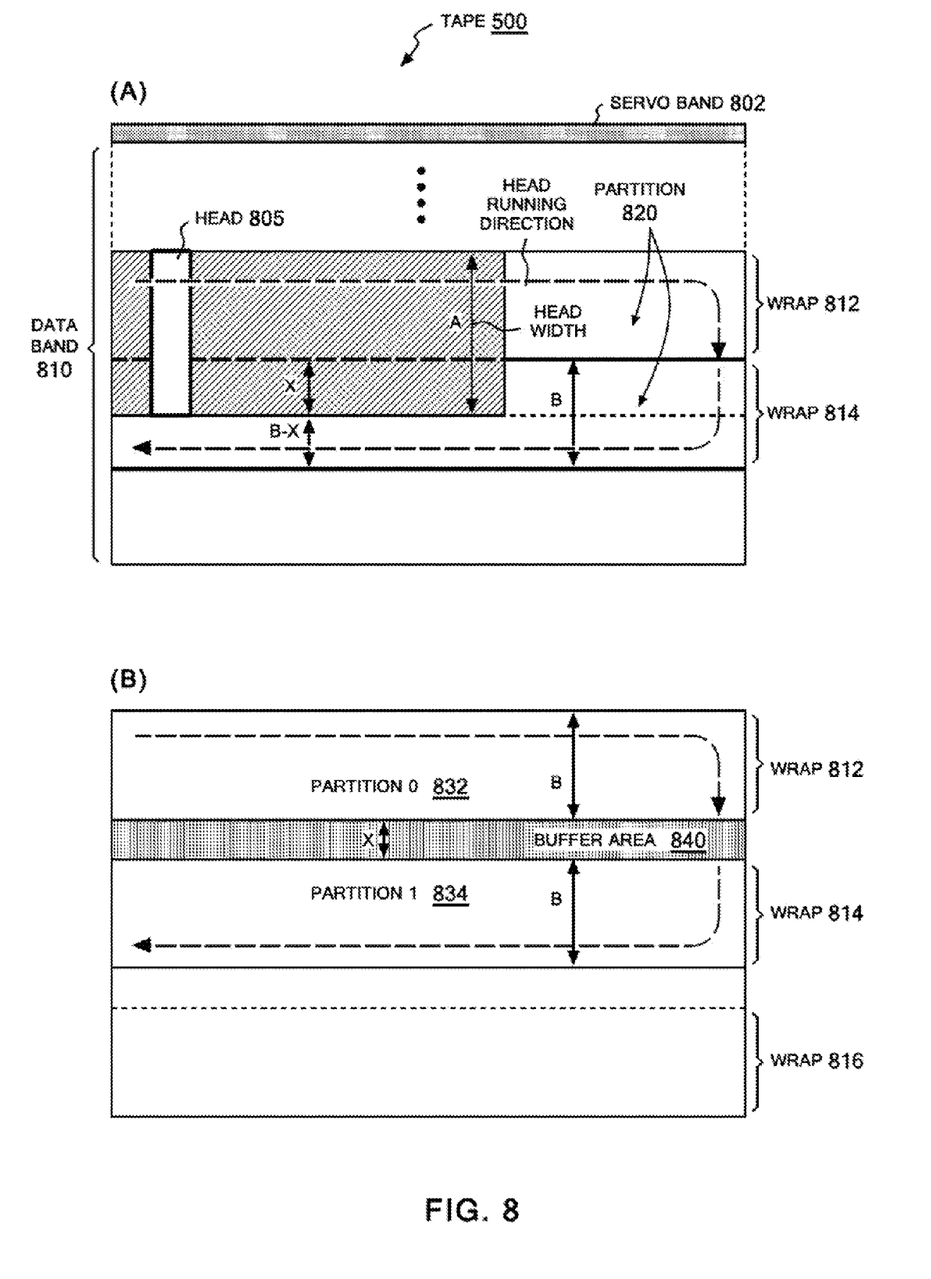
FIGS. 8A and 8B are diagrams showing a relationship between a tape head and a tape, as well as arrangement of multiple partitions according to the present invention.

FIG. 8A shows a relationship between a tape head and wraps on the tape. FIG. 8B shows an arrangement example of multiple partitions according to the present invention. Here, it should be noted that the illustration of the wraps in FIGS. 8A and 8B differs from that of the wraps in FIG. 5 for the purpose of simplifying the description. FIG. 8A shows how data is written on the tape 500 by a tape head 805 (14*b* in FIG. 1). Normally, a single partition 820 is formed of multiple wraps 812 and 814. The head, which is a mechanism for writing data, has a width A wider than a width B of each of the wraps where data is to be actually written. For this reason, when data is written in spiral form in each data band (DB) as shown in FIG. 5, data is written while the head is shifted toward the center of the data band, and then, a portion of the written data protruding from the wrap toward the center of the data band is overwritten when data is to be written next time. For example, when data is written to the tape 500 by use of the tape head 805, the data is written while the head is shifted toward the center of the data band 810 if the width of the head is larger than the width of each of the wraps.

As shown by an arrow in a broken line in FIG. 8A, data is continuously written to the wraps 812 and 814 on the tape 500. When data is written to the wrap 812, the data spreads out by the amount of width X on the wrap 814 adjacent to the centerline of the data band 810. This is because the write width A of the head 805 is larger than the wrap width B. Accordingly, as shown in FIG. 8B, when partitions 0 832 and 1 834 are individually arranged on the respective wraps 812 and 814, a buffer area 840 corresponding to the spread-out width X can be preferably provided. Alternatively, the write width and the wrap width may be set to be equal to each other to omit the buffer area.

Figure 9:
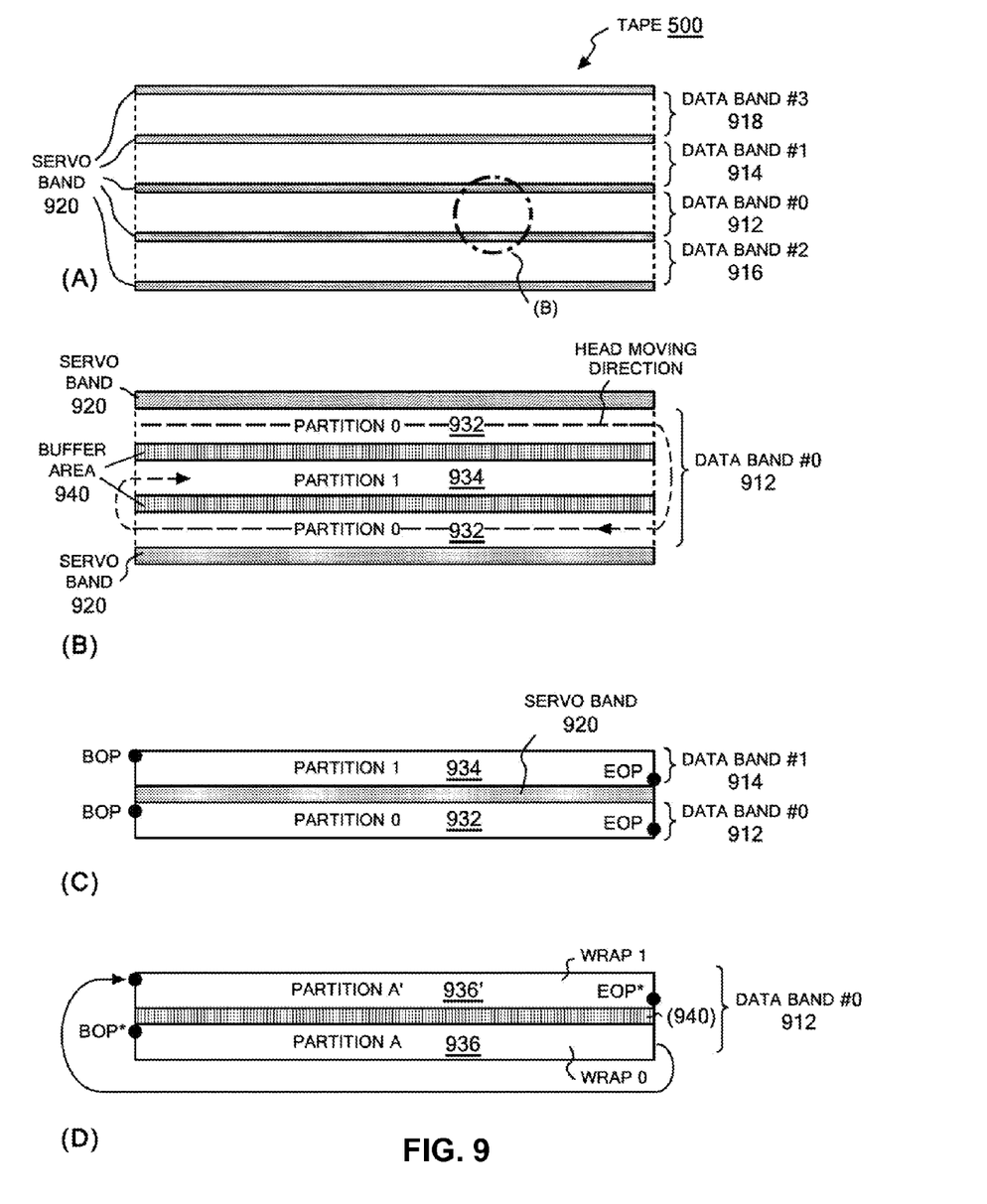
FIGS. 9A to 9D are diagrams showing a relationship between data bands and multiple partitions on a tape.

FIGS. 9A to 9D show a relationship between data bands 912 to 918 and multiple partitions on the tape 500. Specifically, FIGS. 9A to 9D show an example of the tape 500, which shows a relationship between buffer areas and partitions. FIG. 9A shows a diagram of the entire tape, and as described in FIG. 5, the data bands #0 to #3, i.e., 912 to 918 each placed between two of five servo bands 920 are arranged. FIG. 9B shows a diagram in which two partitions #0 and a partition #1 adjacent to each other in the area of the data band #0 (DB0) 912 are spirally arranged. The doted line with arrows in FIG. 9B shows a moving direction of the tape head. As shown in FIG. 9B, when multiple partitions are created in the same data band (DB), a buffer area 940 is preferably provided between adjacent two of the multiple partitions. FIG. 9C illustrates a case where partitions 932 and 934 (partitions 0 and 1) are respectively provided in the data bands 912 and 914 (DB #0 and DB #1). In this case, no buffer area (940) needs to be formed between adjacent partitions as in the case shown in FIG. 9B. Note that, BOP shown in FIG. 9C indicates the beginning of a partition (BOP) and EOP shown in FIG. 9C indicates the end of the partition (EOP), which are arranged in a corresponding one of the partitions, and the servo band 920 is arranged between the partitions.

FIG. 9D shows a diagram showing a state where an empty area is increased by moving the beginning of a partition (BOP) by the method according to the present invention in a single partition split across two wraps in a single data band. For the sake of convenience, partition portions forming the single partition are denoted by reference numerals A and A', respectively. Specifically, FIG. 9D shows a case where the beginning of a partition (BOP) and the end of the partition (EOP) are respectively arranged at the beginning position of the partition A 936 and the end position of the partition A'936' unlike the arrangement shown in FIG. 9C, so that an area continuous from the end of the partition A to the beginning of the partition A' is formed. In this case, as shown in FIG. 9D, the buffer area 940 may be provided between the wraps, but the buffer area 940 is not necessarily provided because data can be written in spiral form while the head is shifted toward the center of the data band, and the spread-out portion is overwritten when writing is performed next time.

The present embodiment has been described using an example of the case where BOP is moved to the back of the tape, but the direction in which BOP is moved is not necessarily the back of the tape, and may be moved to the front thereof. In a case where a portion around EOD is not additionally written (overwritten) because BOP having moved to the back is moved again to the front, the data that is previously determined to be unnecessary in the front of the BOP can be recovered. Specifically, when data is additionally written, and the BOP and EOP are moved in such a way that the BOP and EOP are arranged to shift from the state shown in FIG. 3D to FIG. 3B, the not-overwritten data area among the data existing in the area between the BOP and EOD shown in FIG. 3B becomes readable.

According to the embodiment described above, a virtually endless tape can be realized in a storage device by dynamically moving the positions of the beginning of a partition (BOP) and the end of the partition (EOP). Specifically, the tape medium can be continuously used without copying only necessary data onto another tape medium (such an operation is called reclaim). In addition, an area occupied by unnecessary data is considered to be an empty area. Thus, the data usage amount of the tape medium can be reduced.

The present invention realizes a virtually endless tape in a tape drive by dynamically moving the positions of the beginning of a partition (BOP) and the end of the partition (EOP). Specifically, the tape medium can be continuously used without copying only necessary data onto another tape medium (such operation is called reclaim). In addition, since the area occupied by unnecessary data is considered to be an available capacity space, the data usage amount of the tape medium is reduced.

When files are recorded in a magnetic tape drive, an unused empty area is not increased in the tape even when an unnecessary file is deleted. Further, the tape capacity is not wastefully consumed in accordance with a file size, every time a file is updated. In view of these explanations, readers will recognize that the benefits of tape recording according to embodiments of the present invention include:

effective use of tape that increases an empty area of the tape without loss of necessary data on the tape, keeping data on a tape even when the beginning of a partition is updated in a tape, provides a tape drive that allows data to be continuously and almost permanently written to a tape while keeping data determined by a host system to be necessary, and reducing unnecessary data area that often exists on a front half portion of a tape and thereby increasing an empty area of the tape.

It will be understood from the foregoing description that modifications and changes may be made in various embodiments of the present invention without departing from its true spirit. The descriptions in this specification are for purposes of illustration only and are not to be construed in a limiting sense. The present invention is not limited to the example embodiments described above, and various changes, improvements and the like of the present invention are possible within the scope of the present invention. The scope of the present invention is limited only by the language of the following claims.

What is claimed is:

1. A tape recording method for a tape recorder that has a tape including at least one partition and that controls access to the tape, the method comprising the steps of:
    identifying a position of data on the tape;
    sequentially reading necessary data areas in the data;
    sequentially copying the necessary data areas to a beginning of an empty area on the tape;
    creating a continuous front empty area formed of unnecessary data areas and copy source areas of the necessary data areas on the tape; and
    moving a beginning of the partition (BOP) to a position immediately after the front empty area and updating position information on the BOP;
    in the step of identifying a position of the data, positions of the unnecessary data areas and the necessary data areas on the tape are identified according to record numbers corresponding to the data, the record numbers being stored in a controller of the tape recorder; and
    the step of copying the necessary data areas includes a step of updating, after the copying operation, a content of a record number correspondence table including positions of the copy sources and copy destinations of the data, and the copying step is repeatedly performed for the necessary data areas which exist between the beginning of the partition before being updated and an optional one of the necessary data areas.

2. The tape recording method according to claim 1, further comprising a step of moving an end of the partition (EOP) to a position at an end of the front empty area and adjacent to the beginning of the partition (BOP) on the tape and updating position information on the EOP.

3. The tape recording method according to claim 1 wherein:

the necessary data areas created at respective copy destinations by the copying operation form a continuous necessary data group, the necessary data group is located at a position immediately before the empty area of the tape, and the empty area and the front empty area are arranged logically adjacent to each other to be continuous.

4. The tape recording method according to claim 3 wherein:

a logical end of data (EOD) is located at an end of the necessary data group, the copying step includes a step of sequentially overwriting the position of the end of the data (EOD) with the necessary data areas, and the end of the data (EOD) is sequentially rearranged at the beginning of the empty area of the tape along with the overwriting step.

5. The tape recording method according to claim 1, wherein the position information on the BOP and the record number correspondence table are stored in a storage selected from the group consisting of: a tape cartridge memory (CM) embedded in a tape cartridge that houses the tape; a house keeping data set (HKDS) area located outside a user data area on the tape; and a memory of a host system externally connected to the tape recorder.

6. The tape recording method according to claim 1, further comprising a step of switching the tape recorder to an idle mode before the step of identifying a position of the data on the tape, wherein the step of creating the front empty area includes a step of identifying the copy source areas of the necessary data areas as a new unnecessary data area.

7. The tape recording method according to claim 1, further comprising the steps of:

moving the beginning of the partition (BOP) to a predetermined position in the front empty area of the tape, and moving an end of the partition (EOP) to a position immediately before the predetermined position and adjacent to the beginning of the partition (BOP); and updating the position information on the BOP and the EOP.

* * * * *